(12) United States Patent
Nicot et al.

(10) Patent No.: US 7,192,041 B2
(45) Date of Patent: Mar. 20, 2007

(54) SUSPENSION STOP INSTRUMENTED UNDER DEFORMATION IN ORDER TO MEASURE FORCES

(75) Inventors: Christophe Nicot, Quintal (FR); Olivier Blanchin, Annecy (FR)

(73) Assignee: S.N.R. Roulements, Annecy (FR)

( * ) Notice: Subject to any disclaimer, the term of this patent is extended or adjusted under 35 U.S.C. 154(b) by 330 days.

(21) Appl. No.: 10/712,033

(22) Filed: Nov. 14, 2003

(65) Prior Publication Data

US 2004/0100057 A1   May 27, 2004

(30) Foreign Application Priority Data

Nov. 27, 2002   (FR)   .................. 02 14897

(51) Int. Cl.
     B60G 25/00   (2006.01)
(52) U.S. Cl. .................. 280/124.147; 280/124.155; 188/321.11
(58) Field of Classification Search ......... 280/124.155, 280/124.146, 124.147; 188/1.11 R, 1.11 E, 188/321.11; 267/220
    See application file for complete search history.

(56) References Cited

U.S. PATENT DOCUMENTS

| 3,863,497 | A | * | 2/1975 | van de Vaart et al. ........ 73/654 |
| 4,531,759 | A | * | 7/1985 | Rezanka et al. ...... 280/124.155 |
| 4,800,751 | A | * | 1/1989 | Kobayashi et al. ........ 73/118.1 |
| 4,817,983 | A | * | 4/1989 | Virani ................. 280/124.108 |
| 5,086,649 | A | * | 2/1992 | Yamaoka .................... 73/118.1 |
| 5,330,166 | A | * | 7/1994 | Aoki .......................... 267/220 |
| 5,484,161 | A | * | 1/1996 | McIntyre ............. 280/124.155 |
| 5,834,646 | A | * | 11/1998 | Kvisteroy et al. ....... 73/514.29 |
| 5,947,459 | A | * | 9/1999 | Ducloux et al. ............ 267/221 |
| 5,971,432 | A | * | 10/1999 | Gagnon et al. ............. 280/735 |
| 5,979,218 | A | * | 11/1999 | Biddle et al. .............. 73/11.04 |
| 6,056,446 | A | * | 5/2000 | Welter et al. ............... 384/607 |
| 6,149,190 | A | * | 11/2000 | Galvin et al. ............... 280/735 |
| 6,199,874 | B1 | * | 3/2001 | Galvin et al. ............ 280/5.514 |
| 6,260,836 | B1 | * | 7/2001 | Aoyama et al. ............ 267/221 |
| 6,492,979 | B1 | * | 12/2002 | Kent et al. ................... 345/173 |
| 6,736,381 | B2 | * | 5/2004 | Chesne ....................... 267/220 |
| 2001/0026057 | A1 | * | 10/2001 | Hayashi et al. ....... 280/124.155 |
| 2002/0012484 | A1 | * | 1/2002 | Salou et al. ................. 384/448 |
| 2002/0061148 | A1 | * | 5/2002 | Salou et al. ................. 384/448 |
| 2002/0131659 | A1 | * | 9/2002 | Rutter et al. ................ 345/173 |
| 2003/0074977 | A1 | * | 4/2003 | Doemens et al. ............. 73/818 |
| 2003/0160369 | A1 | * | 8/2003 | LaPlante et al. ............ 267/136 |
| 2004/0104552 | A1 | * | 6/2004 | Nicot et al. ........... 280/124.155 |

* cited by examiner

Primary Examiner—Eric Culbreth
Assistant Examiner—Barry Gooden, Jr.
(74) Attorney, Agent, or Firm—Arent Fox LLP

(57) ABSTRACT

The invention concerns a suspension stop for a motor vehicle wheel, comprising a device for measuring the forces applied to the vehicle wheel, the said device comprising at least one deformation sensor (12) which is associated with a fixed member (1, 6) of the said stop so as to measure the deformations of the said member which are caused by the said forces applied, and a calculation means able, from these deformations, to calculate the corresponding forces applied.

5 Claims, 2 Drawing Sheets

Figure 1:
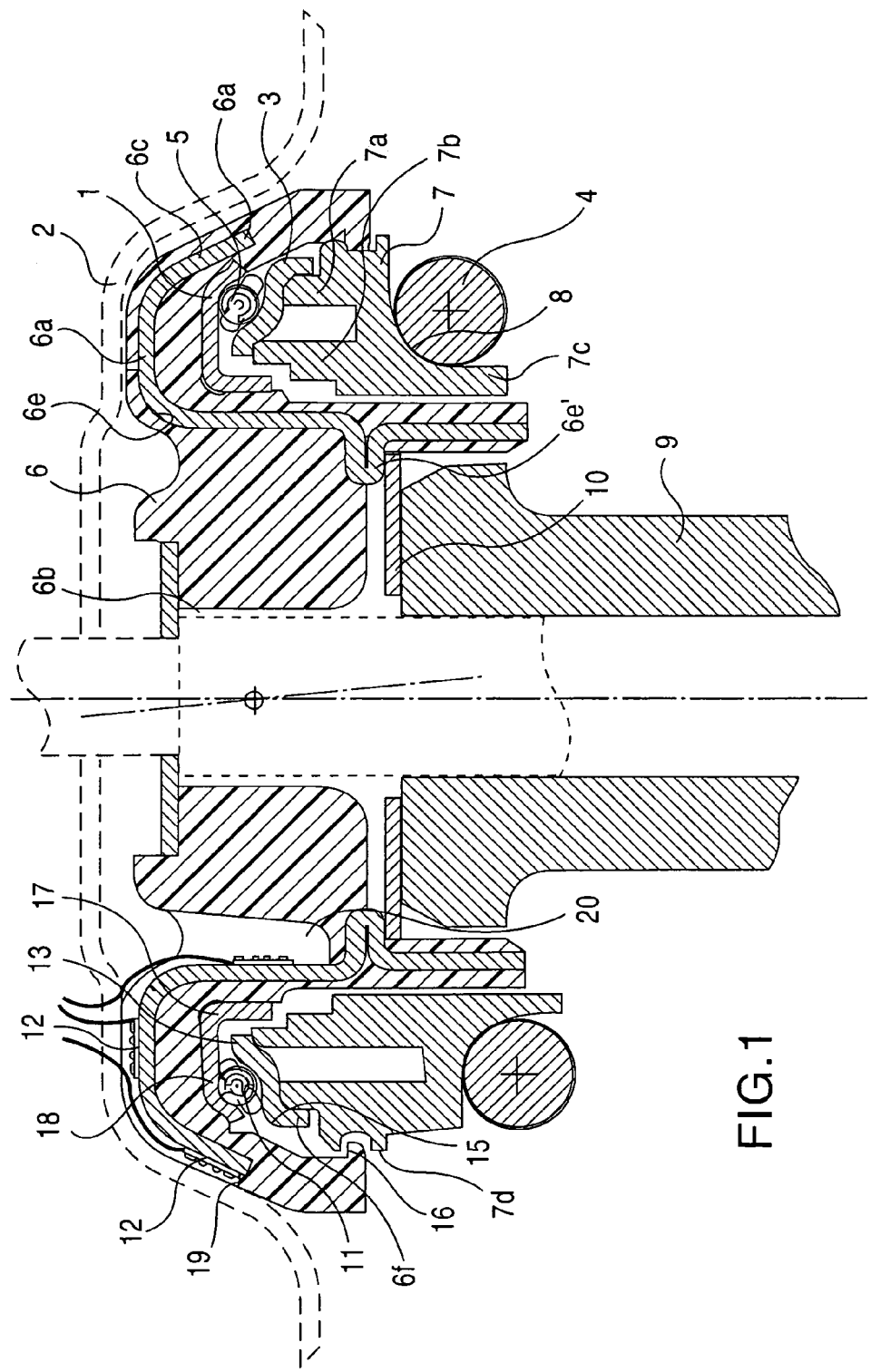

SUSPENSION STOP INSTRUMENTED UNDER DEFORMATION IN ORDER TO MEASURE FORCES

FIELD OF THE INVENTION

The invention concerns a suspension stop for a motor vehicle wheel.

DESCRIPTION OF RELATED ART

Known stops conventionally comprise a fixed member intended to be secured to the vehicle chassis and a rotating member intended to be fixed with respect to rotation to the suspension spring.

In particular, the stops can comprise a bearing provided with a fixed top race, a rotating bottom race and rolling bodies disposed between the said races.

Thus the stops make it possible to connect the wheels to the chassis of the vehicle by means of suspensions and associated springs, leaving the wheels free to move angularly and withstanding the multiaxis forces due to the running conditions (acceleration, braking, the state of the surface, cornering, etc).

In particular, the vertical forces to which the wheel is subjected will be transferred to the vehicle chassis, passing partly through the suspension stop, which causes a deformation of the components of the said stop.

Moreover, it is desirable to measure the forces suffered by the vehicle wheels, in particular for the requirements of a certain number of electronic assistance systems on the vehicle, for example intended for active safety, driving comfort (in particular suspension control) or a reduction in fuel consumption.

For this purpose, it is known how to directly measure the forces exerted by the road on the vehicle, these measurements being made either at the tyre or at the components of the wheel set. However, these measurement strategies have a certain number of limitations.

In particular, when the measurement is made on the tyre, which is a rotating component, there are posed problems of transmitting the signal in a fixed reference frame so as to be able to derive the modulus of forces therefrom, and this all the more critically since the signals are numerous and must be analysed in real time in order to be able to control the assistance systems.

Concerning the measurement on the wheel-set components, the main problem which is posed is that of the analysis of the signals in order to derive therefrom the modulus of forces respectively in the three directions in space. This is because the application of a transverse force to the bottom of the wheel creates a moment of tilt at the bearing which is due to the lever arm represented by the radius of the wheel. The effect of the transverse force will therefore be preponderant on the effect of the vertical force, which makes the exact determination of this vertical force difficult.

BRIEF SUMMARY OF THE INVENTION

To resolve these drawbacks, the invention proposes to measure, at the vehicle suspension stop, the vertical forces applied to the wheel of the said vehicle, and this indirectly by measuring continuously the deformations of a fixed member of the stop which are caused by the said vertical forces.

To this end, the invention proposes a suspension stop for a motor vehicle wheel, comprising a device for measuring the forces applied to the vehicle wheel, the said device comprising at least one deformation sensor which is associated with a fixed member of the said stop so as to measure the deformations of the said member which are caused by the said forces applied, and a calculation means able, from these deformations, to calculate the corresponding forces applied.

According to one embodiment, the device is arranged so as to measure the vertical forces applied to the vehicle wheel.

Figure 2:
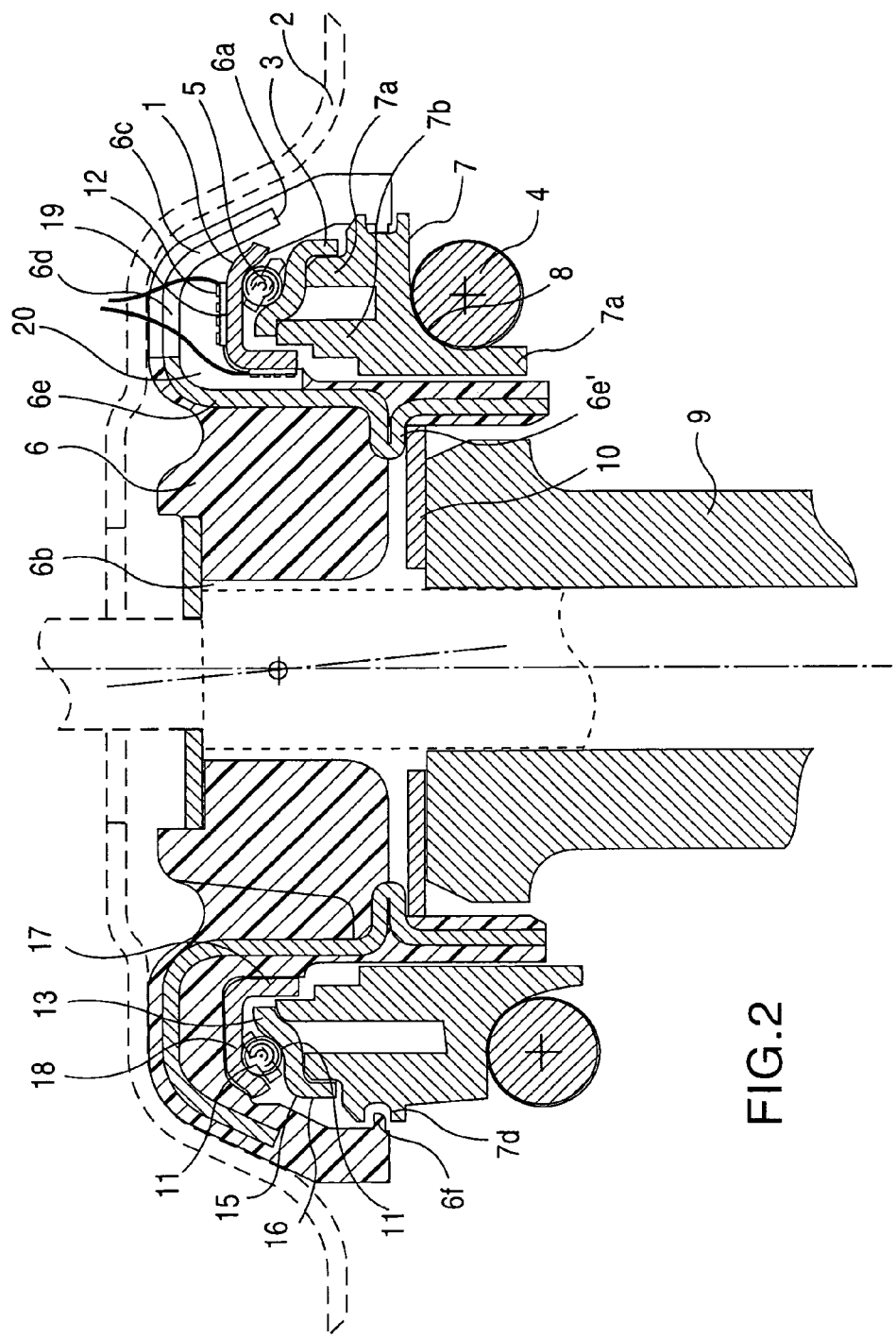

Other objects and advantages of the invention will emerge during the following description, made with reference to the accompanying drawings, in which FIGS. 1 and 2 are partial views in longitudinal section of a stop in which the deformation sensors are associated respectively with the top cup and the top race.

DETAILED DESCRIPTION OF THE INVENTION

In relation to the figures, a suspension stop is described for a motor vehicle wheel which comprises a roller bearing provided with a fixed top race 1 which is secured to the chassis 2 of the vehicle, a rotating bottom race 3 which is rotationally fixed to the suspension spring 4 and rolling bodies 5 disposed between the said races so as to allow the relative rotations of the said races about an axis.

In the remainder of the description the terms "top" and "bottom" are defined with respect to respectively top and bottom locations in the suspension stops as depicted in the figures, the terms "internal" and "external" are defined with respect to locations respectively close to or far away from the rotation axis, the terms "vertical" or "axial" and "transverse" or "radial" are defined with respect to a plane respectively parallel and perpendicular to the rotation axis.

In the embodiments depicted, the suspension stop comprises a top cup 6 associated with the top race 1, the said cup being associated with the chassis 2, and a bottom cup 7 associated with the bottom race 3.

The bottom cup 7 is formed by an essentially annular piece which comprises a housing 8 in which the end part of the spring 4 comes in abutment whilst providing a relative rotational fixing of the spring 4 on the bottom cup 7. The bottom cup 7 is for example obtained by moulding a thermoplastic material of the polyamide 6.6 type.

The top cup 6 is formed by an essentially annular piece which, in the embodiments depicted, is formed from rubber moulded onto an annular reinforcing insert 6a, the said cup comprising a bore 6b arranged so as to receive the end of the rod of the suspension damper.

The insert 6a comprises, from outside to inside and connected to each other, a substantially axial ring 6c, a radial annular part 6d and a cylindrical skirt 6e extending axially downwards from the external edge of the radial part 6d. The axial skirt 6e comprises an annular radial fold 6e' for the abutment of a snubber 9 by means of an insert 10 mounted on the said snubber.

The snubber 9 comprises an axial annular part and a cylindrical skirt extending axially downwards from the external edge of the radial part.

The races 1, 3 of the bearing each consist of a pressed sheet metal ring which are respectively associated, for example by force-fitting, with the two cups 6, 7, the said races comprising raceways 11 disposed facing each other so as to receive the running bodies 5 which, in the embodiments depicted, are spherical. In particular, the geometries of the cups 6, 7 and of the associated races 1, 3 are arranged so as to allow reliable fixing of the races 1, 3 on the cups 6, 7, in particular vis-à-vis radial forces.

Although the description of the invention is given in relation to a suspension stop of the "third generation" type in which the filtering block is integrated in the top cup 6, the invention can be directly transposed by a person skilled in the art to suspension stops having another general structure, that is to say in which the various functional members of the stop are arranged differently. In addition, the description given is also directly transposable to a suspension stop of the type without a roller bearing, for example of the plain bearing type or comprising an elastomeric piece which is deformable under torsion, the said stop always comprising a fixed member. This is because the invention concerns the integration of the suspension stop of a device for measuring the vertical or axial forces applied to the vehicle wheel.

The measuring device comprises at least one deformation sensor 12 which is associated with a fixed member 1, 6 of the said stop so as to measure the deformations of the said member which are caused by the forces applied to the wheel, and a calculation means able, from these deformations, to calculate the corresponding forces applied.

In particular, the deformation sensor or sensors 12 can be chosen from amongst the sensors comprising strain gauges based on piezoresistive elements, surface acoustic wave sensors or magnetic field sensors, for example based on sensitive elements of the magnetoresistor, giant magnetoresistor, Hall effect or tunnel effect magnetoresistor.

According to the invention, it is therefore possible to measure the forces, in particular vertical, applied to a wheel associated with the chassis 2 of a motor vehicle by means of the stop.

This is because the forces applied to a wheel through the chassis 2 or vice-versa, in particular due to the running conditions, result in deformations of the fixed members 1, 6 of the stop.

And it is possible to determine a law for the behaviour under deformation of a fixed member 1, 6 according to the forces applied, for example resulting from theory or an initial calibration, and to use this law in the calculation means in order to link the deformations measured to the forces, in particular vertical, which are undergone.

In FIGS. 1 and 2, the bottom race 3 comprises, from inside to outside and connected together, a radial ring 13, the raceway 11 and a ring comprising a radial part 15 and an axial part 16. The internal ring 13 is offset axially towards the top with respect to the radial part 15. The bottom cup 7 comprises on the top side two cylindrical projections 7a, 7b intended to be housed respectively against a ring 13, 15 so as to provide reliable connection of the bottom race 3 to the cup 7. Moreover, the bottom cup 7 comprises, on the bottom side, a cylindrical projection 7c which forms the axial wall of the housing 8, the radial wall of the said housing being formed by the bottom face of the body of the bottom cup 7.

The top race 1 comprises, from inside to outside and connected together, an axial ring 17, a radial ring 18 and the raceway 11.

In FIG. 1, the deformation sensors 12 are associated with the top cup 6 which is produced from a material which is arranged so as to deform elastically under the effect of the forces to which it is subjected, for example made from steel.

The sensors 12, three in number, comprise a dielectric substrate forming a plate 19 to which gauges or sensitive elements are adhesively bonded or formed by screen printing or an equivalent method. In order to measure the deformations of the part of the cup 6 with which the plate 19 is associated, the plate 19 is rigidly fixed to the cup 6, for example by adhesive bonding or welding. In addition, the distribution of the gauges or sensitive elements on the plate 19 can be arranged so as to measure the extension and torsion deformations.

In the embodiment depicted in FIG. 1, the measurement of the deformations is carried out in three different planes so as to improve the precision of the measurement of the forces. To this end, each plate 19 is associated, in a housing 20 provided in the cup 6, respectively on the external face of the substantially axial ring 6c, on the top face of the radial part 6d and on the external face of the skirt 6e. In addition, the plates 19 are disposed close to the roller bearing.

In this embodiment, the forces are transmitted to the insert 6 in particular by contact between the radial fold 6e' and the snubber 9, which forms preferential deformation areas on the insert 6, on which it is therefore advantageous to make the measurements.

In FIG. 2, the deformation sensors 12 are associated with the top ring 1 which is produced from a material arranged so as to deform elastically under the effect of the forces to which it is subjected, for example made from steel.

The sensors 12, two in number, have a structure similar to that described in relation to FIG. 1 and the plates 19 are rigidly fixed to the race 1, for example by adhesive bonding or by welding.

In the embodiment depicted in FIG. 2, the measurement of the deformations is carried out in two different planes so as to improve the precision of the measurement of the forces. To this end, each plate 19 is associated, in a housing 20 provided in the cup 6, respectively on the external face of the axial ring 17 and on the top face of the radial ring 18.

In this embodiment, the stresses exerted on the roller bearing and the rotation of the bottom race 3 caused by the forces, in particular vertical, form preferential deformation areas on the top race 1, on which it is therefore advantageous to make the measurements.

According to an embodiment depicted in the figures, the ends 7d, 6f of the bottom 7 and top 6 cups have a geometry arranged so as to cooperate so as to form a static sealing means for the measuring device. This is because external pollution is thus prevented from entering inside the stop, which in particular protects the sensor 12 from any contaminants.

The invention claimed is:

1. A suspension stop for a motor vehicle wheel, comprising a suspension spring, a damper and a snubber, the stop comprising:
   a top cup secured to a chassis of the vehicle, and providing an abutment for the snubber;
   a roller bearing provided with a fixed top race secured to the top cup, a rotating bottom race fixed to the suspension spring, and rolling bodies disposed between the races; and
   a device for measuring the forces applied to the vehicle wheel, the device comprising at least one deformation sensor which is associated with the top race so as to measure the deformations of the top race caused by the forces applied, and a calculation means for calculating, from these deformations the corresponding forces applied.

2. The stop according to claim 1, wherein the device is arranged to measure vertical forces applied to the vehicle wheel.

3. The stop according to claim 1, further comprising a bottom cup associated with the bottom race and providing an abutment for the spring.

4. The stop according to claim 1, wherein the bottom and top cups each comprise extensions which cooperate so as to form a static sealing means to protect the sensor or sensors.

5. The stop according to claim 1, wherein the at least one deformation sensor is selected from the group consisting of strain gauges based on piezoresistive elements, surface acoustic wave sensors and magnetic field sensors.

* * * * *